US006847885B2

(12) United States Patent
Sato et al.

(10) Patent No.: US 6,847,885 B2
(45) Date of Patent: Jan. 25, 2005

(54) VEHICLE INFORMATION PROVIDING APPARATUS, ON-VEHICLE INFORMATION PLAYING APPARATUS, VEHICLE INFORMATION PROVIDING METHOD AND ON-VEHICLE INFORMATION PLAYING METHOD

(75) Inventors: Koji Sato, Yokohama (JP); Satoshi Okamoto, Fujisawa (JP); Noriyuki Abe, Yokohama (JP); Hisanori Ohara, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 52 days.

(21) Appl. No.: 10/314,231

(22) Filed: Dec. 9, 2002

(65) Prior Publication Data

US 2003/0114968 A1 Jun. 19, 2003

(30) Foreign Application Priority Data

Dec. 17, 2001 (JP) ........................................ 2001-383067
Dec. 17, 2001 (JP) ........................................ 2001-383068

(51) Int. Cl.[7] .......................... G01C 21/00; G06F 17/00
(52) U.S. Cl. ...................................... 701/201; 701/204
(58) Field of Search ........................... 701/1, 201, 204; 340/995.12, 995.13; 342/357.09

(56) References Cited

U.S. PATENT DOCUMENTS

| 5,987,377 | A | * | 11/1999 | Westerlage et al. ......... 701/204 |
| 6,594,580 | B1 | * | 7/2003 | Tada et al. ................... 701/211 |
| 2001/0003825 | A1 | * | 6/2001 | Gotou et al. ................ 709/203 |
| 2001/0008404 | A1 | | 7/2001 | Naito et al. |

FOREIGN PATENT DOCUMENTS

JP         2000-99441 A      4/2000

* cited by examiner

*Primary Examiner*—Michael J. Zanelli
(74) *Attorney, Agent, or Firm*—Foley & Lardner LLP

(57) ABSTRACT

An information providing center calculates an estimated traveling time to elapse before a vehicle arrives at a destination by using traveling information transmitted from an on-vehicle system and determines contents information to be provided to the on-vehicle system in conformance to the calculated traveling time. The information providing center prepares a program list containing the contents information that has been selected, information indicating the order in which the contents information is to be played and media information indicating how the contents information is to be obtained and transmits the program list to the on-vehicle system. The on-vehicle system obtains and plays the contents information as indicated in the transmitted program list.

23 Claims, 8 Drawing Sheets

FIG.3

| PROGRAM NUMBER | INFORMATION CATEGORY | ACTION | EVENT |
|---|---|---|---|
| 1 | Weather | D/L+TTS | |
| 2 | Music 1 (R&B1) | CD Player | |
| 3 | Traffic Information | D/L+TTS | |
| 4 | Music 2 (HipHop) | CD Player | |
| 5 | News (economy) | CD Player | |
| 6 | Music 3 (R&B2) | D/L+TTS | 9:00 AM |
| 7 | Traffic Information | D/L+TTS | |
| 8 | News (sports) | D/L+TTS | |
| 9 | Music 4 (Famous) | CD Player | |

D/L: DOWNLOAD
TTS: TEXT-TO-SPEECH SYNTHESIS

FIG.5

(LENGTH: SEC)

| PROGRAM NUMBER | 1 | 2 | 3 | 4 | 5 | 6 | 7 | 8 | 9 | 10 | TOTAL |
|---|---|---|---|---|---|---|---|---|---|---|---|
| CATEGORY | TRAFFIC INFORMATION | WEATHER FORECAST | GENERAL NEWS | SPORTS NEWS | MUSIC 1 | COMMUNITY INFORMATION | MUSIC 2 | SHOPPING INFORMATION | MUSIC 3 | MUSIC 4 | |
| STANDARD | 140 | 115 | 485 | 565 | 300 | 185 | 320 | 205 | 345 | 340 | 3000 |
| SHORTEN 1 | 120 | 100 | 400 | 400 | 280 | 150 | 290 | 180 | 320 | 315 | 2555 |
| SHORTEN 2 | 100 | 80 | 200 | 200 | 150 | 120 | 160 | 120 | 175 | 170 | 1475 |
| SHORTEN 3 | 50 | 0 | 100 | 100 | 0 | 0 | 0 | 0 | 100 | 170 | 520 |
| SHORTENING PRIORITY ORDER | 9 | 1 | 10 | 8 | 2 | 4 | 5 | 3 | 6 | 7 | |
| EXTEND 1 | 160 | 130 | 600 | 800 | 300 | 200 | 320 | 300 | 345 | 340 | 3495 |
| EXTEND 2 | 180 | 150 | 800 | 1000 | 300 | 400 | 320 | 400 | 345 | 340 | 4235 |
| EXTEND 3 | 250 | 225 | 1200 | 1500 | 450 | 600 | 480 | 600 | 520 | 510 | 6335 |
| EXTEND PRIORITY ORDER | 2 | 10 | 1 | 3 | 9 | 7 | 6 | 8 | 5 | 4 | |

FIG.8 (LENGTH: SEC)

| | NO. | 1 | 2 | 3 | 4 | 5 | 6 | 7 | 8 | 9 | 10 | TOTAL |
|---|---|---|---|---|---|---|---|---|---|---|---|---|
| | CATEGORY | TRAFFIC INFORMATION | WEATHER FORECAST | GENERAL NEWS | SPORTS NEWS | MUSIC 1 | COMMUNITY INFORMATION | MUSIC 2 | SHOPPING INFORMATION | MUSIC 3 | MUSIC 4 | |
| ③ | STANDARD | 140 | 115 | 485 | 565 | 300 | 185 | 320 | 205 | 345 | 340 | 3000 |
| ④ | SHORTEN 1 | 120 | 100 | 400 | 400 | 280 | 150 | 290 | 180 | 320 | 315 | 2555 |
| ⑤ | DIFFERENCE | -20 | -15 | -85 | -165 | -20 | -35 | -30 | -25 | -25 | -25 | |
| ⑥ | RANK | 2 | 1 | 9 | 10 | 2 | 8 | 7 | 4 | 4 | 4 | 1475 |
| ⑦ | SHORTEN 2 | 100 | 80 | 200 | 200 | 150 | 120 | 160 | 120 | 175 | 170 | |
| ⑧ | DIFFERENCE | -40 | -35 | -285 | -365 | -150 | -65 | -160 | -85 | -170 | -170 | |
| ⑨ | RANK | 2 | 1 | 9 | 10 | 5 | 3 | 6 | 4 | 7 | 7 | 520 |
| ⑩ | SHORTEN 3 | 50 | 0 | 100 | 100 | 0 | 0 | 0 | 0 | 100 | 170 | |
| ⑪ | DIFFERENCE | -90 | -115 | -385 | -465 | -300 | -185 | -320 | -205 | -245 | -170 | |
| ⑫ | RANK | 1 | 2 | 9 | 10 | 7 | 4 | 8 | 5 | 6 | 3 | |
| ⑬ | CONTENTS SHORTENING PRIORITY ORDER | 9 | 1 | 10 | 8 | 2 | 4 | 5 | 3 | 6 | 7 | |
| ⑭ | TIME DIFFERENCE 1 | 140 | 100 | 485 | 565 | 300 | 185 | 320 | 205 | 345 | 340 | 2985 |
| ⑮ | DIFFERENCE | 0 | -15 | 0 | 0 | 0 | 0 | 0 | 0 | 0 | 0 | -15 |
| ⑯ | 2 | 140 | 100 | 485 | 565 | 280 | 185 | 320 | 205 | 345 | 340 | 2965 |
| ⑰ | DIFFERENCE | 0 | -15 | 0 | 0 | -20 | 0 | 0 | 0 | 0 | 0 | -35 |
| ⑱ | 3 | 120 | 100 | 485 | 565 | 280 | 185 | 320 | 205 | 345 | 340 | 2945 |
| ⑲ | DIFFERENCE | -20 | -15 | 0 | 0 | -20 | 0 | 0 | 0 | 0 | 0 | -55 |
| ⑳ | 4 | 120 | 100 | 485 | 565 | 280 | 185 | 320 | 180 | 345 | 340 | 2920 |
| ㉑ | DIFFERENCE | -20 | -15 | 0 | 0 | -20 | 0 | 0 | -25 | 0 | 0 | -80 |
| ㉒ | 5 | 120 | 100 | 485 | 565 | 280 | 185 | 320 | 180 | 320 | 340 | 2895 |
| ㉓ | DIFFERENCE | -20 | -15 | 0 | 0 | -20 | 0 | 0 | -25 | -25 | 0 | -105 |
| ㉔ | 6 | 120 | 100 | 485 | 565 | 280 | 185 | 320 | 180 | 320 | 315 | 2870 |
| ㉕ | DIFFERENCE | -20 | -15 | 0 | 0 | -20 | 0 | 0 | -25 | -25 | -25 | -130 |
| ㉖ | 7 | 120 | 100 | 485 | 565 | 280 | 185 | 290 | 180 | 320 | 315 | 2840 |
| ㉗ | DIFFERENCE | -20 | -15 | 0 | 0 | -20 | 0 | -30 | -25 | -25 | -25 | -160 |
| ㉘ | 8 | 120 | 100 | 485 | 565 | 280 | 150 | 290 | 180 | 320 | 315 | 2805 |
| ㉙ | DIFFERENCE | -20 | -15 | 0 | 0 | -20 | -35 | -30 | -25 | -25 | -25 | -195 |
| ㉚ | 9 | 120 | 100 | 485 | 565 | 280 | 150 | 290 | 180 | 320 | 315 | 2720 |
| ㉛ | DIFFERENCE | -20 | -15 | -85 | 0 | -20 | -35 | -30 | -25 | -25 | -25 | -280 |
| ㉜ | 10 | 120 | 100 | 400 | 400 | 280 | 150 | 290 | 180 | 320 | 315 | 2555 |
| ㉝ | DIFFERENCE | -20 | -15 | -85 | -165 | -20 | -35 | -30 | -25 | -25 | -25 | -445 |

VEHICLE INFORMATION PROVIDING APPARATUS, ON-VEHICLE INFORMATION PLAYING APPARATUS, VEHICLE INFORMATION PROVIDING METHOD AND ON-VEHICLE INFORMATION PLAYING METHOD

BACKGROUND OF THE INVENTION

1. Field of the Invention

The present invention relates to a vehicle information providing apparatus of and method for providing information to a vehicle and an on-vehicle information playing apparatus of and method for playing the information provided to the vehicle.

2. Description of the Related Art

Means that are employed to utilize information in the known art include broadcasting means such as radios and television sets, package means such as tapes and disks on which information is recorded and on-demand systems in which specific information that has been requested is obtained via a communication means. A user of information provided through a broadcasting means in which the information is provided in a batch, i.e., a program, cannot adjust the length of time over which the information is utilized (the user cannot control the volume of information he is provided with). A user of information provided through a package means in which varying volumes of pre-recorded information are provided cannot adjust the length of time over which the information is utilized (the user cannot control the volume of information he is provided with), either. In the case of a utilization means adopting an on-demand system, too, requested information is provided in a batch, and thus, the user cannot adjust the length of time over which the information is utilized (the user cannot control the volume of information he is provided with). Accordingly, methods of providing a user with information by adjusting the information volume have been developed.

Japanese Laid-Open Patent Publication No. 2000-99441 discloses an information presenting apparatus that presents a user with information the volume of which is adjusted in conformance to the current state of the information user. This apparatus adjusts the information volume in conformance to the time length preset by the information user or in conformance to the average time length over which the information user has used information in the past.

SUMMARY OF INVENTION

However, the information presenting apparatus in the related art is not capable of adjusting the volume of information provided to a user aboard a vehicle in conformance to the length of time the user spends in the vehicle, which varies depending upon the traveling distance to the destination and traffic conditions including traffic jams.

An object of the present invention is to provide a vehicle information providing apparatus that provides a vehicle with information needed to adjust the information volume in conformance to the length of time over which information is utilized inside the vehicle. Another object of the present invention is to provide an on-vehicle information playing apparatus that plays information the volume of which is adjusted in conformance to the length of time over which the information is to be utilized.

A vehicle information providing apparatus according to the present invention comprises a communication device that exchanges information with a vehicle, a traveling time estimation device that estimates a traveling time to elapse before the vehicle arrives at a destination based upon traveling information transmitted from the vehicle, an information selection device that selects information to be provided to the vehicle based upon a request transmitted from the vehicle, a list preparation device that prepares an information list of the information to be provided to the vehicle, which is selected by the information selection device so as to match a length of time over which the information is to be provided with the traveling time estimated by the traveling time estimation device and a control device that controls the communication device so as to transmit the information list prepared by the list preparation device to the vehicle.

An on-vehicle information playing apparatus according to the present invention comprises a playback device that plays information in conformance to an information list listing a plurality of sets of information to be played in a vehicle, a traveling time estimation device that estimates a traveling time to elapse before the vehicle arrives at a destination based upon vehicle traveling information, a playback time calculation device that calculates a playback time length for the information played by the playback device and an information list modification device that individually modifies the sets of information listed in the information list so as to match the playback time length calculated by the playback time calculation device with the traveling time estimated by the traveling time estimation device.

A vehicle information providing method according to the present invention comprises receiving traveling information transmitted from a vehicle, estimating a traveling time to elapse before the vehicle arrives at a destination based upon the traveling information that has been received, selecting information to be provided to the vehicle based upon a request transmitted from the vehicle, preparing an information list of information to be provided to the vehicle, which is selected so as to match a length of time over which the information is to be provided with the estimated traveling time and transmitting the information to the vehicle in conformance to the information list that has been prepared.

An on-vehicle information playing method for playing information in conformance to an information list listing a plurality of sets of information to be played in a vehicle comprises estimating a traveling time to elapse before the vehicle arrives at a destination based upon vehicle traveling information, calculating a playback time length for playing the information to be played in the vehicle and individually modifying the sets of information listed in the information list so as to match the calculated playback time length with the estimated traveling time.

BRIEF DESCRIPTION OF THE DRAWINGS

FIG. 3 presents an example of a program list;

FIG. 5 presents an example of the program list used in the third embodiment;

FIG. 8 presents an example of the playback time lengths and the judging threshold values used to reduce the playback time lengths.

DETAILED DESCRIPTION OF THE PREFERRED EMBODIMENTS

First Embodiment

The following is an explanation of an embodiment of the present invention, given in reference to drawings.

Figure 1:
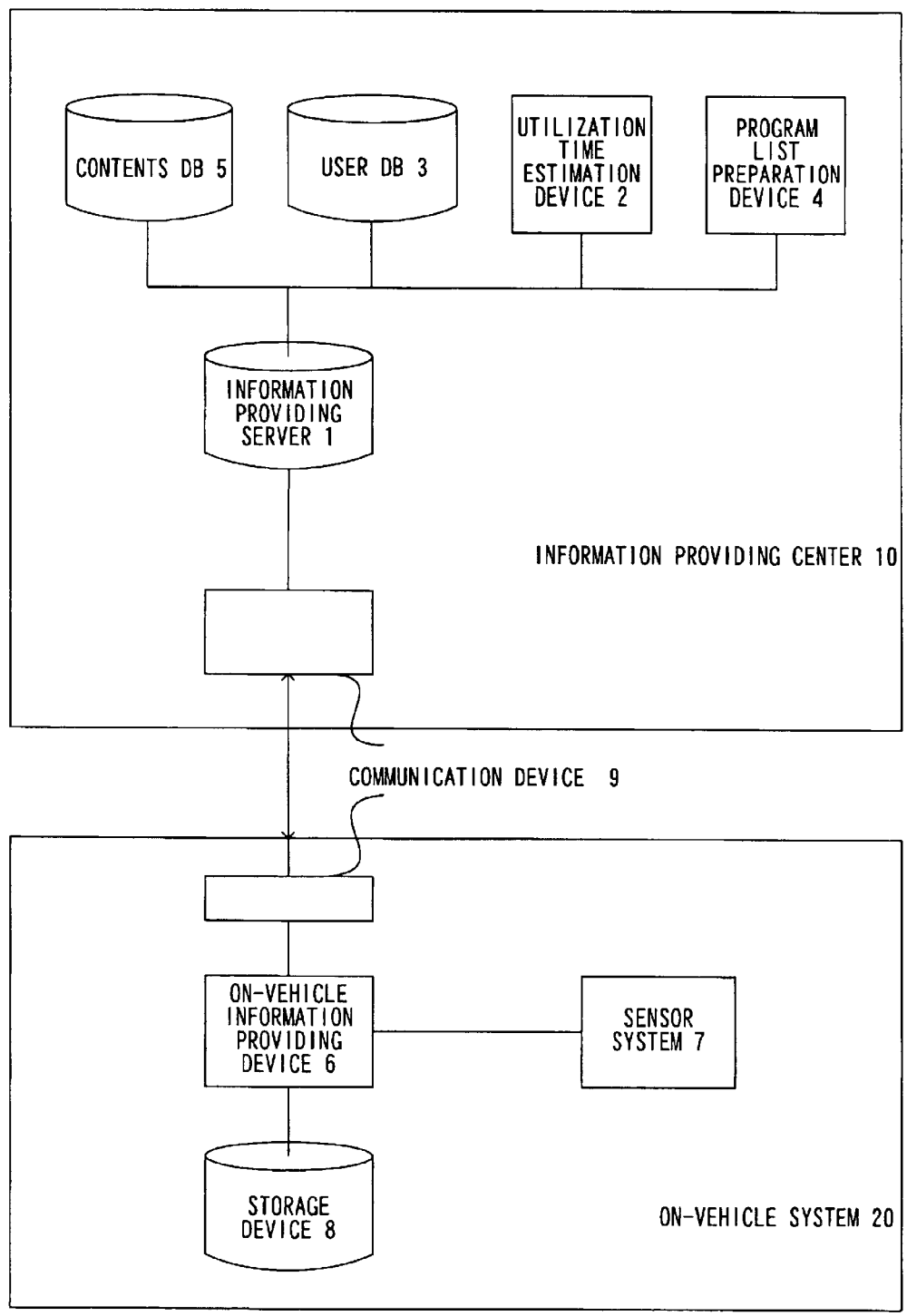
FIG. 1 is a block diagram of a vehicle information providing system that includes the vehicle information providing apparatus according to the present invention, achieved in a first embodiment.

FIG. 1 shows a block diagram of a vehicle information providing system having a vehicle information providing apparatus (an information providing center) and an on-vehicle information playing apparatus (an on-vehicle system). The vehicle information providing system includes an information providing center 10 and an on-vehicle system 20 installed in a customer vehicle. The information providing center 10 provides the customer with information by engaging in wireless communication with the on-vehicle system 20. In this context, the information provided to the on-vehicle system 20 is referred to as contents information.

The information providing center 10 comprises an information providing server 1, a utilization-time estimation device 2, a user database 3, a program list preparation device 4 and a contents database 5. In the user database 3, user information such as user attributes and past utilization history is stored. In the contents database 5, contents information to be transmitted from the information providing center 10 to the on-vehicle system 20 is stored.

The information providing server 1, which is connected to the Internet, obtains information that is not stored in the contents database 5 as necessary by engaging in two-way communication with other Web site servers on the Internet. The information providing server 1 also engages in two-way communication with the on-vehicle system 20 via a communication device 9 to exchange various types of information. The communication device 9 may be, for instance, a mobile telephone.

The utilization-time estimation device 2 calculates the estimated length of time that the vehicle is estimated to take to reach the destination by using traveling information such as the vehicle speed transmitted from the vehicle. The program list preparation device 4 determines the contents information to be provided to the on-vehicle system 20 and prepares a program list accordingly.

The contents information provided to the on-vehicle system 20 includes the following.
a) Contents information provided from the information providing center 10 to the vehicle (e.g., music, current news, information originating from Web sites),
b) contents information available in the on-vehicle system 20 (e.g., music recorded in an on-vehicle CD), and
c) contents information directly obtained by the on-vehicle system 20 without using the information providing center 10 (e.g., broadcast radio).

The on-vehicle system 20 comprises an on-vehicle information providing device 6, a sensor system 7 and a storage device 8. It is to be noted that the term "vehicle" as used in the specification refers to a vehicle mounted with an on-vehicle system 20.

The on-vehicle information providing device 6 may be constituted of, for instance, a navigation system, an audio device, a radio receiver and the like (not shown). The on-vehicle system 20 engages in two-way communication with the information providing center 10 via the communication device 9 (e.g., a mobile telephone line). The contents information provided to the on-vehicle system 20 is played through a speaker by a playback device installed in the vehicle (not shown). At this time, the on-vehicle information providing device 6 plays the contents information sequentially by following the numbers assigned to the programs in the program list transmitted from the information providing center 10. The program list is detailed later.

The sensor system 7 detects vehicle traveling information indicating the vehicle traveling speed, the acceleration state and the like. The storage device 8 stores the program list and the contents information provided from the information providing center 10.

The information providing apparatus (the information providing center 10) achieved in the first embodiment calculates the estimated length of time that the vehicle is estimated to take to reach the destination based upon the traveling information transmitted from the vehicle and determines the contents information to be provided to the customer vehicle in correspondence to the length of time thus calculated. The information providing center 10 prepares a program list that contains the contents information that has been determined, the order in which the contents information is to be played and media information indicating how the contents information is to be obtained. The prepared program list is then transmitted to the customer vehicle. The on-vehicle system 20 in the customer vehicle obtains and plays the contents information as indicated in the program list thus provided.

Figure 2:
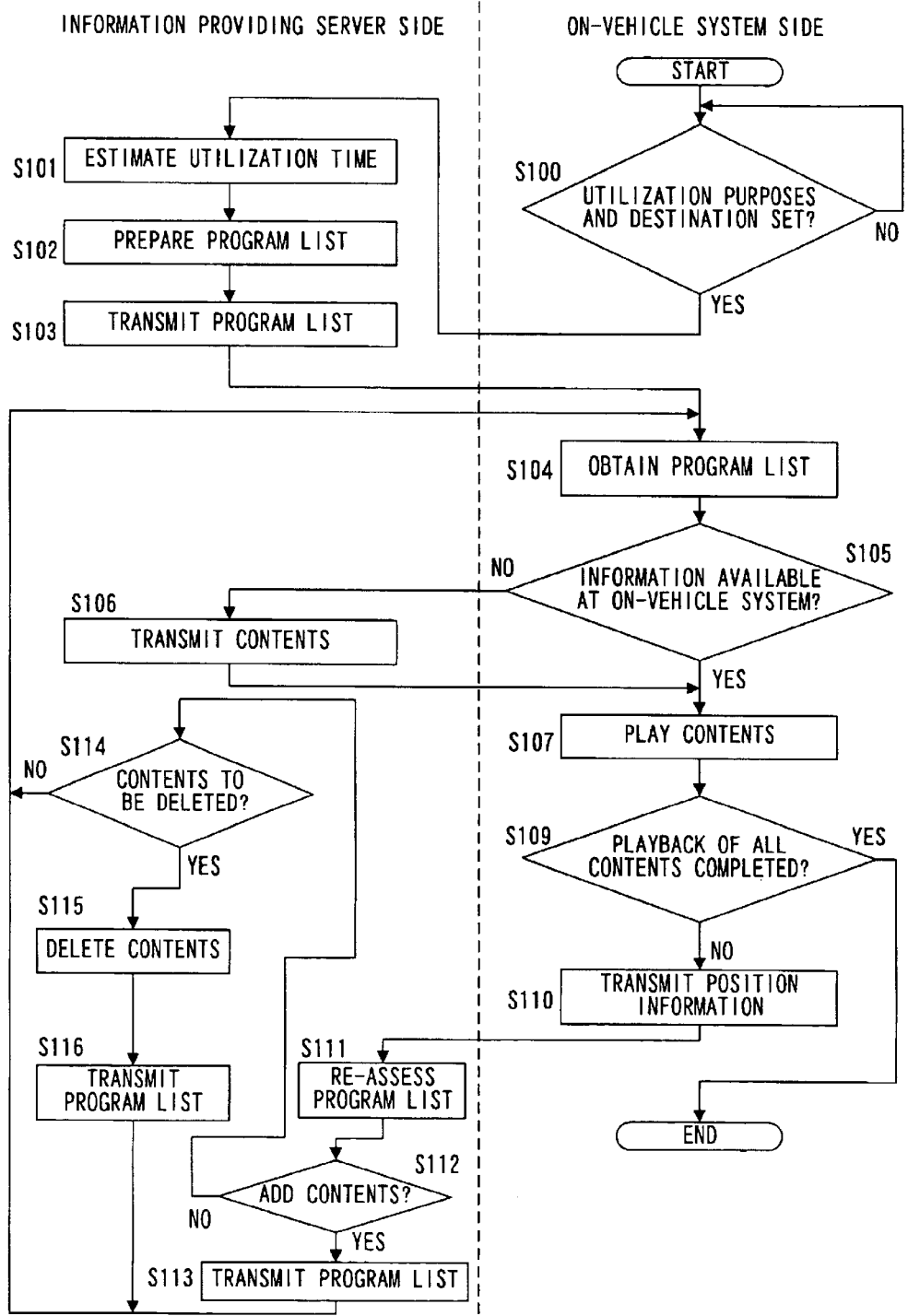
FIG. 2 presents a flowchart of the processing executed in the vehicle information providing system in the first embodiment.

FIG. 2 presents a flowchart of the processing executed in the vehicle information providing system in the first embodiment. The processing on the left side in FIG. 2 is executed at the information providing center 10, whereas the processing on the right side in FIG. 2 is executed at the on-vehicle system 20. The processing shown in FIG. 2 is started up in response to a processing start instruction issued by the vehicle driver.

In step S100, it is judged as to whether or not the vehicle driver has set a destination for the vehicle and utilization purposes for contents information. The vehicle destination is set through the navigation system (not shown) constituting a component of the on-vehicle information providing device 6. A contents information utilization purposes may be one of the following.
1) Obtain weather information
2) Obtain traffic information
3) Listen to news
4) Listen to music The on-vehicle information providing device 6 may allow the driver to specify the area and the time period for obtaining weather information. In addition, the driver may be allowed to specify the area and the traveling direction for obtaining traffic information. He may also be allowed to specify a category of news he wishes to listen to, and to specify the type of music he wishes to listen to.

If it is judged in step S100 that the vehicle destination and the contents information utilization purposes have been set, the on-vehicle system 20 transmits a request for contents information together with the information indicating the destination and the utilization purposes which had been entered to the information providing center 10. If, on the other hand, it is judged that no vehicle destination or contents information utilization purposes has been set, the operation waits in standby in step S100.

The contents information to be played in the vehicle may include contents information prepared in the on-vehicle information providing device 6. To play such contents information, information indicating the storage location of the contents information is transmitted to the information providing center 10 when requesting the contents information. For instance, if the user wishes to listen to music recorded on a CD loaded in a CD player in the audio device (not shown), information indicating the disk number assigned to the CD and the track number is transmitted to the information providing center 10. If, on the other hand, the user wishes to listen to music recorded as music data in the storage device 8 within the on-vehicle information providing device 6, path information indicating the location at which the music data are recorded is transmitted. The on-vehicle system 20 also transmits route information on the route searched by the navigation system (not shown) and information indicating the current position of the vehicle to the information providing center 10. It is to be noted that the current vehicle position is detected through GPS (Global Positioning System) navigation or autonomous navigation.

In step S101, the information providing center 10 estimates the length of time over which the information is to be a utilized at the on-vehicle system 20 based upon the information transmitted from the on-vehicle system 20. The information utilization time length is equivalent to the estimated length of time that the vehicle is estimated to take to reach the destination. The estimated traveling time may be determined by, for instance, dividing the traveling distance calculated based upon the route information transmitted from the on-vehicle system 20 by a specific traveling speed.

Once the utilization time length is estimated, the operation proceeds to step S102. In step S102, the program list preparation device 4 at the information providing center 10 extracts contents information matching the utilization purposes described above from the contents database 5 so as to fit the total of the lengths of the playback time of the contents information to be provided within the estimated utilization time length, and prepares a program list listing the contents information to be transmitted to the on-vehicle system 20. It is to be noted that if contents information prepared in the on-vehicle information providing device 6 is specified as the contents information to be played, the contents information stored at the specified location within the on-vehicle information providing device 6 is selected.

FIG. 3 presents an example of the program list prepared at the information providing center 10. In the program number section in FIG. 3, the order in which the contents information is to be played at the vehicle is indicated. In the section indicating the categories of the information that is to be provided, the titles of contents information matching the specific utilization purposes are listed. In FIG. 3, four categories, i.e., weather, music, traffic information and news, are listed.

In the action section in the program list in FIG. 3, media information indicating how the specific contents information is to be obtained is provided. "D/L" (download) indicates that the information is provided from the information providing center 10 to the on-vehicle system 20. "TTS" (text-to-speech synthesis) indicates that text data that are transmitted are first converted to audio data, and are then output with mechanized voice. "CD player" indicates that the information is played at the CD player (not shown) within the on-vehicle information providing device 6. In the event section of the program list in FIG. 3, a time point specified by the driver at which specific contents information is to be played is indicated. The specified time point is transmitted together with the contents information request to the information providing center 10 from the on-vehicle system 20.

In step S103, the information providing center 10 transmits the prepared program list to the on-vehicle system 20.

In step S104, the on-vehicle system 20 obtains the program list transmitted from the information providing center 10 before the operation proceeds to step S105. In step S105, the on-vehicle system 20 judges as to whether or not the contents information that is assigned with the lowest program number in the program list and has not been played yet is available within the on-vehicle information providing device 6. Namely, in step S105, it is judged as to whether or not the contents information to be played next is present within the on-vehicle information providing device 6. The on-vehicle system 20 makes an affirmative decision in step S105 if the contents information is present within the on-vehicle information providing device 6 and the operation proceeds to step S107, whereas it makes a negative decision in step S105 if the contents information is not present within the on-vehicle information providing device 6. If a negative decision is made in step S105, the on-vehicle system 20 issues a request to the information providing center 10 for a transmission of the contents information before the operation proceeds to step S106.

Upon receiving the request for the contents information transmission from the on-vehicle system 20, the information providing center 10 reads out the requested contents information from the contents database 5 and transmits the contents information to the on-vehicle system 20 in step S106. After the information providing center 10 transmits the contents information, the operation proceeds to step S107.

In step S107, the on-vehicle system 20 plays the contents information through the speaker by employing the playback device (not shown) installed in the vehicle before the operation proceeds to step S109. In step S109, the on-vehicle system 20 judges as to whether or not the playback of all the contents information listed in the program list has been completed. If it is judged that the playback of all the contents listed in the program list has been completed, the on-vehicle system 20 ends the processing in the flowchart in FIG. 2. If, on the other hand, it is judged that the playback of all the contents has not been completed yet, the operation proceeds to step S110. In step S110, the on-vehicle system 20 transmits the information indicating the current vehicle position detected by the navigation system (not shown) to the information providing center 10. Once the information indicating the current position is transmitted to the information providing center 10, the operation proceeds to step S111.

In step S111, the information providing center 10 re-estimates the information utilization time length over which the information is to be utilized at the on-vehicle system 20 by using the information transmitted from the on-vehicle system 20. Namely, the processing performed in step S101 is executed again. Once the information utilization time length is re-estimated, the operation proceeds to step S112. In step S112, it is judged as to whether or not new contents information is to be added into the program list.

If, for instance, the estimated time point at which the vehicle is estimated to arrive at the destination has been moved back, the latest estimate on the information utilization time length is greater than the initially estimated utilization time length and in such a case, the playback of the contents information listed in the program list will be finished well before the estimated utilization time elapses. If, on the other hand, the vehicle is estimated to arrive at the destination sooner than initially estimated, for instance, the latest estimate on the information utilization time length is smaller than initially estimated utilization time length and in such a case, the playback of the contents information in the program list will not be completed within the estimated utilization time length.

The information providing center 10 reassesses the contents information program list so as to fit the total of the lengths of playback time required to play the contents information yet to be played within the most recently estimated utilization time length. If the latest estimate on the information utilization time length is greater than the total of the lengths of playback time required for playing the contents information yet to be played, an affirmative decision is made in step S112 before the operation proceeds to step S113. If, on the other hand, the latest estimate on the information utilization time length is smaller than the total of the lengths of playback time required for playing the contents information yet to be played, a negative decision is made in step S112 before the operation proceeds to step S114.

In step S113, the information providing center 10 extracts new contents information matching a utilization purpose from the contents database 5 and adds the extracted contents information into the program list. As explained earlier, if contents information available within the on-vehicle information providing device 6 is specified, the specified contents information is selected from the on-vehicle information providing device 6. The information providing center 10 transmits the newly prepared program list to the on-vehicle system 20 before the operation returns to step S104.

In step S114, the information providing center 10 judges as to whether or not any contents information should be deleted from the program list. If it is judged by the information providing center 10 that the latest estimate on the information utilization time length is smaller than the total of the lengths of playback time for playing the contents information yet to be played, the operation proceeds to step S115. If, on the other hand, the information providing center 10 judges that the latest estimate on the information utilization time length is greater than the total of the lengths of playback time required for playing the contents information yet to be played, the operation returns to step S104. In the latter case, the program list remains unchanged.

In step S115, the information providing center 10 deletes from the program list the contents information assigned with the highest program number, for instance, among the contents information that has not been played and then the operation proceeds to step S116. In step S116, the information providing center 10 transmits the program list without the contents information deleted in step S115 to the on-vehicle system 20 before the operation returns to step S104.

While the explanation above has been given on an example in which information is provided from the information providing center 10 to a single vehicle, information may be provided to a plurality of vehicles. In such a case, the information providing center 10 concurrently executes the processing described above with the individual on-vehicle systems 20 installed in the plurality of vehicles.

The following advantages are realized through the vehicle information providing system achieved in the first embodiment.

(1) Since contents information is selected and played in correspondence to the utilization purposes specified by the vehicle driver (e.g., obtaining weather information, obtaining traffic information, listening to the news and listening to music), contents information matching the specific needs of the driver can be played.

(2) If the contents information is available in the on-vehicle system 20 at the vehicle (e.g., music recorded in a CD), the information at the on-vehicle system 20 is utilized, if the contents information can be obtained directly by the on-vehicle system 20 without accessing the information providing center 10 (e.g., a program broadcast on the radio), the information obtained directly by the on-vehicle system 20 is utilized, and if the contents information is not available at the on-vehicle system 20 and at the same time cannot be obtained directly by the on-vehicle system 20 (e.g., information registered at a Web site on the Internet or information registered in the information providing center 10), the information transmitted from the information providing center 10 to the on-vehicle system 20 is utilized. As a result, information selected from a wide range of categories can be played.

(3) Each time contents information is played, the estimated length of time required by the vehicle to reach the destination is calculated as the estimated information utilization time length based upon the information indicating the vehicle destination and the current vehicle position. By adding or deleting contents information in the program list so as to fit the playback time within the estimated information utilization time length, the length of time over which the contents information yet to be played is played is adjusted. As a result, a failure to complete the playback of the contents information before the vehicle arrives at the destination and premature completion of the playback of all the contents information prior to the arrival at the destination are prevented, and thus, the volume of information to be provided to the user is correctly adjusted. In addition, even when the estimated length of traveling time changes due to a traffic jam in the traveling route to the destination, an on-route break taken by the driver or the like, the updated estimate on the information utilization time length is constantly calculated and, as a result, the contents information can be played by efficiently utilizing the time elapsing while the vehicle travels.

(4) The information indicating the current vehicle position, the information indicating the destination and the route information indicating the route searched at the on-vehicle system 20 are transmitted from the on-vehicle system 20 to the information providing center 10. The information providing center 10 is thus enabled to estimate the information utilization time length over which the information is to be utilized in the vehicle by using the route information. When there are a plurality of routes that may be taken to reach the destination, in particular, the estimated length of time that the vehicle is estimated to take to arrive at the destination can be even more accurately calculated by selecting a specific traveling route and, as a result, the information utilization time length can be estimated with a higher degree of accuracy.

In the event section in FIG. 3, an area name may be recorded instead of a specific time point. In such a case, the specific contents information should be played when the vehicle enters the area indicated in the event section. The name of the specified area should be transmitted together with the contents information request to the information providing center 10 from the on-vehicle system 20.

If the contents information is a program broadcast on the radio, "Radio 80 MHz", for instance, should be entered in the action section in FIG. 3. In this case, the on-vehicle information providing device 6 receives the radio broadcast with the frequency entered in the action section when playing the contents information and plays the received radio broadcast through the speaker. It is to be noted that if the contents information is a radio program, an affirmative decision is made in step S105 in the flowchart presented in FIG. 2.

In the explanation given above, a discrepancy occurs between the total of the lengths of playback time required for playing the contents information yet to be played and the information utilization time length as the estimated arrival time changes due to a delay caused by a traffic jam, a break taken by the driver or the like. However, even when the estimated arrival time does not change, a discrepancy between the total length of time required for playing the contents information yet to be played and the information utilization time length is estimated to occur if the playback of the contents information is halted. For instance, if the playback of the contents information is halted so as to allow the driver to answer a telephone call, the total length of playback time required to play the contents information yet to be played becomes greater than the estimated information utilization time length. In such as case, too, the estimated information utilization time length is calculated each time a set of contents information is played and, accordingly, the program list listing the contents information is modified based upon the estimated information utilization time length most recently calculated.

Second Embodiment

During the reassessment of the program list, the program list may be modified by taking into consideration the playback time point set for specific contents information. In the program list shown in FIG. 3, the time point at which Music 3 assigned with program number 6 is to be played is entered in the event section. This playback time point is set in advance by the driver. Let us now hypothesize that the driver of the vehicle temporarily stopped the playback of the contents information while the traffic information assigned with program number 3 was being played. As the driver issues an instruction to resume the contents information playback, the on-vehicle system 20 resumes the playback of the traffic information. In step S109 in FIG. 2, the on-vehicle system 20 decides that there is contents information assigned with program numbers larger than 3 and thus yet to be played at the completion of the playback of the traffic information and, accordingly, the operation proceeds to step S110. In step S110, the on-vehicle system 20 transmits the information indicating the current vehicle position to the information providing center 10.

In step S111, the information providing center 10 references the current time point while reassessing the program list. If the time is fast approaching 9:00 a.m. and thus there is not enough time to play any other contents information or if the current time point is past 9:00 a.m., the information providing center 10 switches the program order and reassigns a new program number 4 to the music (Music 3) originally assigned with program number 6. As a result, the programs assigned with program numbers 4 and 5 in FIG. 3 are reassigned with program numbers 5 and 6 respectively and are moved down in the program list. After the modified program list is transmitted from the information providing center 10 to the on-vehicle system 20, Music 3 is played at the on-vehicle system 20. It is to be noted that the total of the lengths of playback time for playing the contents information yet to be played cannot be closely fitted within the most recent estimate on the utilization time length, contents information is added into/deleted from the program list as in the first embodiment.

In the vehicle information providing system achieved in the second embodiment, the current time point is referenced while reassessing the program list and the program order is switched so as to ensure that specific contents information can be played at the time point requested by the driver. As a result, even when the playback of the contents information in the program list does not progress on schedule as indicated in the original program list, e.g., when the driver temporarily stops the contents information playback in progress, the requested music (Music 3) can be played at the desired time point.

Instead of modifying the program list by taking into consideration the playback time point set for specific contents information, the program list may be modified by factoring in the playback area where specific contents information is to be played. In this case, the driver sets in advance an area where he wishes to have specific contents information played, and the current vehicle position is referenced while reassessing the program list to reorganize the program playback order. As a result, even when the playback of the contents information in the program list does not progress on schedule as indicated in the original program list, e.g., when the driver temporarily stops the contents information playback in progress, the specified contents information can be played as the vehicle enters the requested area.

Third Embodiment

In the vehicle information providing system achieved in the third embodiment, the information providing center 10 prepares a plurality of candidates with varying time lengths for playing each set of contents information. Such candidates with different playback time lengths are to be explained in detail in reference to FIG. 5 later. The information providing center 10 prepares a program list containing contents information determined based upon the estimated information utilization time length and the information utilization purposes, information indicating the order in which the various sets of contents information are to be played, information indicating the plurality of playback time candidates prepared for each set of contents information, information indicating the priority order to be assumed when selecting a new candidate (when changing the playback time length) and media information indicating how the individual sets of contents information are to be obtained, and transmits the prepared program list to the user's vehicle.

The on-vehicle system 20 obtains and plays the contents information as indicated in the program list that has been delivered. During this process, the estimated traveling time is calculated by using the most recent traveling information each time a set of contents information has been played, and the contents information yet to be played is played by selecting the desirable playback time length candidate for a given set of contents information (adjusting the playback time length) in correspondence to the calculated traveling time.

Figure 4:
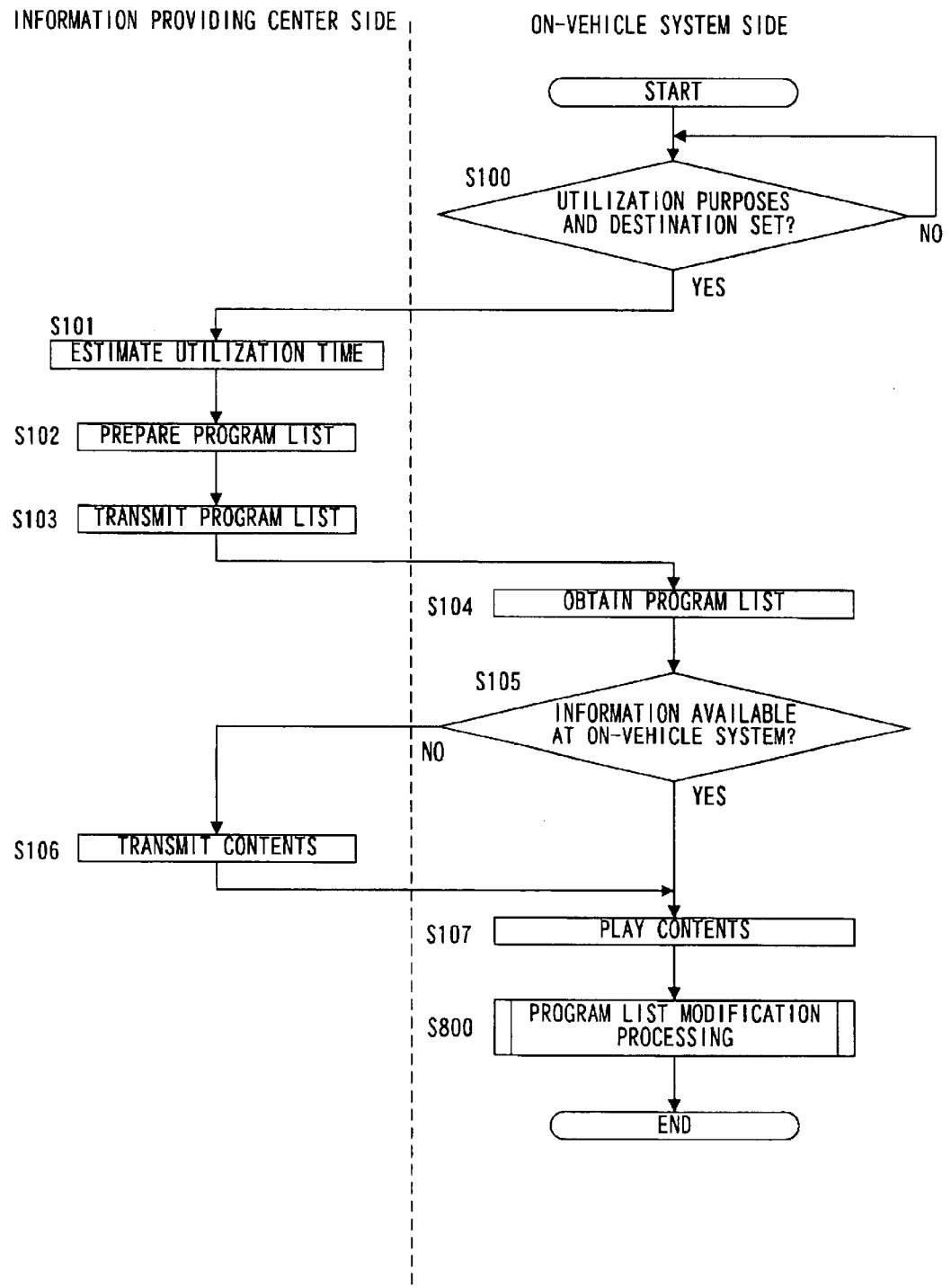
FIG. 4 presents a flowchart of the processing executed in the vehicle information providing system achieved in a third embodiment.

FIG. 4 presents a flowchart of the processing executed in the vehicle information providing system in the third embodiment. The processing on the left side in FIG. 4 is executed at the information providing center 10, whereas the processing on the right side is executed at the on-vehicle system 20. The processing shown in FIG. 4 is started up in response to a processing start instruction issued by the vehicle driver. The same reference numerals are assigned to steps in which processing similar to that in the flowchart in FIG. 2 is performed to preclude the necessity for a detailed explanation thereof.

The processing executed in steps S100~S106 is identical to the processing executed in steps S100~S106 in the flowchart in FIG. 2. In the explanation of the embodiment, it is assumed that the information utilization time length over which information is to be utilized at the on-vehicle system 20, estimated by the information providing center 20 in step S101, is 3200 seconds.

FIG. 5 presents an example of the program list prepared by the information providing center 10. The program list shown in FIG. 5 includes sections indicating different playback modes, i.e., "standard", "shorten 1", "shorten 2", "shorten 3", "extend 1", "extend 2" and "extend 3", a section indicating the shortening priority order and a section indicating the extend priority order as well as a program number section and an information type section.

In the standard section, the standard playback time lengths for the individual sets of contents information are entered. The total of the standard playback time lengths (3000 seconds in the example shown in FIG. 5) is set by ensuring that the playback is completed within the estimated utilization time based upon the utilization time length estimated in step S101.

In the shorten 1~shorten 3 sections, the playback time lengths required to play the contents information in the different shorten modes are entered in units of seconds for each set of contents information. The playback time length for a given set of contents information in the shorten 2 mode is smaller than that in the shorten 1 mode and the playback time length in the shorten 3 mode is smaller than the playback time length in the shorten 2 mode. The playback time length set to 0 indicates cancellation of the playback of the corresponding information. The playback time length for music (a tune), for instance, is reduced by playing the first verse alone or by fading out the ending in a shorten mode. The playback time length of a news program is reduced by playing higher order news items only among news items assigned in advance with priority order numbers or by playing the headlines of the news items alone. Except for when fading out at the ending of a musical tune, the contents of the information to the played are adjusted in conformance to the allocated playback time length and thus, the contents information is abridged so that it is not abruptly cut off in the middle of the playback operation.

In the shortening priority order section, the priority order in which the individual sets of contents information are to be played in a shorten mode is indicated. When reducing the total contents information playback time length, a shorten mode is selected starting with the contents information which is the highest in the priority order (the playback time length for the contents information with the highest priority order is reduced first). In the example presented in FIG. 5, the playback time length for the weather forecast assigned with program number 2 is first reduced and the general news program assigned with program number 3 is the last program the playback time length of which is reduced.

In the extend 1~extend 3 sections, the playback time lengths required to play the contents information in the various extend modes are entered in units of seconds for each set of contents information. The playback time length for playing a given set of contents information in the extend 2 mode is greater than the playback time length in the extend 1 mode, and the playback time length is greater in the extend 3 mode than the playback time length in the extend 2 mode. In an extend mode, the playback time length for a news program, for instance, is extended by adding further details or providing a related news topic in the news. The playback time length for music (a musical tune) is extended by playing the second verse as well as the first verse which alone is played in the standard playback mode or by playing another tune in the same category.

In the extend priority order section, the priority order in which the individual sets of contents information are to be played in an extend mode is indicated. When extending the total contents information playback time length, an extend mode is selected (the playback time length is extended) starting with the contents information that is the highest in the priority order. In the example shown in FIG. 5, the general news program assigned with program number 3 is first played in an extend mode and the weather forecast assigned with program number 2 is the last program to be extended in the priority order which is a reversal of the shortening priority order.

Figure 6:
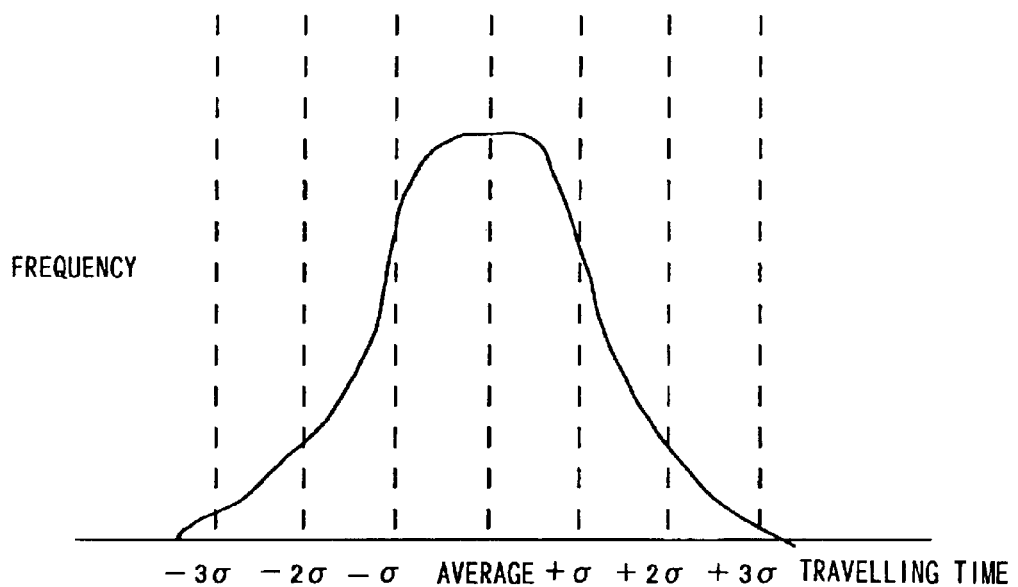
FIG. 6 shows a distribution of varying lengths of time over which vehicles are used.

The playback time lengths in the shorten modes and the extend modes are set by using statistical data. It is generally known that when the utilization time lengths of vehicles, i.e., the lengths of traveling time required to reach destinations, are statistically analyzed in correspondence to a given area where the vehicles are utilized and in correspondence to a given utilization purpose, the deviation in the traveling time assumes a normal distribution. For instance, the vehicle utilization time lengths surveyed by the Ministry of Land, Infrastructure and Transport with regard to vehicles used by commuters in a given urban area or regional zone are distributed as shown in FIG. 6. In FIG. 6, the horizontal axis represents the utilization time length (the traveling time) and the vertical axis represents the frequency (the number of vehicles). The center of the distribution curve indicates the average utilization time length, with $\delta$ representing the standard deviation.

The total of the playback time lengths for the individual sets of contents information in the shorten mode 1 (2555 seconds in the example presented in FIG. 5) is set in correspondence to $-\delta$ in FIG. 6. The total of the playback time lengths for the individual sets of contents information in the shorten mode 2 (1475 seconds in the example presented in FIG. 5) is set in correspondence to $-2\delta$ in FIG. 6. The total of the playback time lengths for the individual sets of contents information in the shorten mode 3 (520 seconds in the example presented in FIG. 5) is set in correspondence to $-3\delta$ in FIG. 6. Likewise, the total of the playback time lengths for the individual sets of contents information in the extend mode 1 (3495 seconds in the example presented in FIG. 5) is set in correspondence to $+\delta$ in FIG. 6, the total of the playback time lengths for the individual sets of contents information in the extend mode 2 (4235 seconds in the example presented in FIG. 5) is set in correspondence to $+2\delta$ in FIG. 6 and the total of the playback time lengths for the individual sets of contents information in the extend mode 3 (6335 seconds in the example presented in FIG. 5) is set in correspondence to $+3\delta$ in FIG. 6.

Thus, the standard playback time lengths in the program list in FIG. 5 are set in conformance to the average utilization time length (the average traveling time), and the playback time lengths for playing the contents information are set by ensuring that they can be adjusted even when the traveling time to the destination changes due to traffic conditions such as a traffic jam in almost all conceivable situations as long as the utilization time length changes as indicated in the distribution diagram in FIG. 6. It is to be noted that a whole range of change in the utilization time in the normal distribution can be covered by setting the playback time lengths over the $\pm 3.3\delta$ range relative to values corresponding to the average travelling time.

The information providing center 10 prepares a program list such as that shown in FIG. 5 (step S102) and transmits the prepared program list to the on-vehicle system 20 (step S103).

The on-vehicle system 20 receives the program list that has been transmitted (step S104) and judges as to whether or not the individual sets of contents information included in the program list are available at the on-vehicle system 20 (step S105). If the contents information is not available at the on-vehicle system 20, the on-vehicle system 20 issues a request to the information providing center 10 for a contents information transmission. Upon receiving the request, the information providing center 10 transmits the requested contents information to the on-vehicle system 20 (step S106) The on-vehicle system 20 plays the contents information transmitted from the information providing center 10 and the contents information stored at the storage device 8 through the speaker by employing the playback device (not shown) (step S107). Once the contents information is played, the operation proceeds to step S800.

Figure 7:
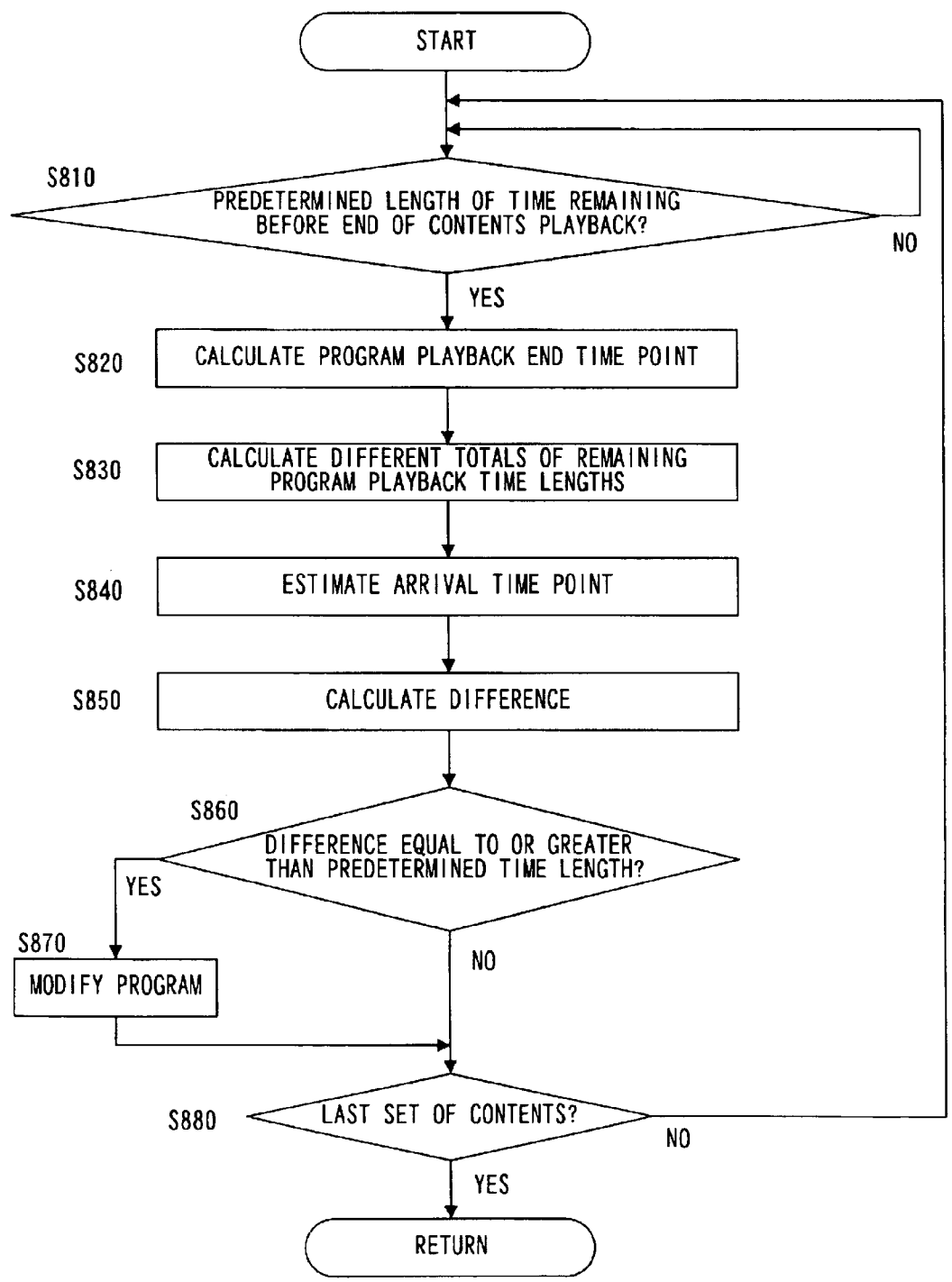
FIG. 7 presents a flowchart of the program modification processing.

In step S800, the on-vehicle system 20 performs program modification processing. FIG. 7 presents a flowchart of the program modification processing. Instep S810, the on-vehicle system 20 judges as to whether or not a predetermined length of time (e.g., 10 seconds) is left before the end of the playback of the contents information currently being played. If it is judged that only the predetermined remaining length of time is left before the contents information playback ends, the operation proceeds to step S820, whereas if it is judged that more than the predetermined length of time remains before the end of the contents information playback, the operation waits in standby in step S810.

In step S820, the on-vehicle system 20 calculates the time point at which the playback of all the contents information in the program list ends by referring to the program list and then the operation proceeds to step S830. If the program list has not been modified so as to change the total playback time length, the sum of the length of time remaining for the playback of the contents information currently being played and the standard playback time lengths corresponding to the individual sets of contents information yet to be played constitutes the entire remaining time. If, on the other hand, the program list has been modified so as to adjust the playback time length, the sum of the length of time remaining for the playback of the contents information currently being played and the playback time lengths for the individual sets of contents information yet to be played in the modified program list constitutes the entire remaining time. The playback end time point is calculated by adding the remaining time to the current time point.

In step S830, the on-vehicle system 20 individually calculates the totals of the playback time lengths required to play the various sets of contents information (the remaining programs) yet to be played after the playback of the contents information currently being played ends if the entire playback time length indicated in the program list at present is to be shortened and extended and then the operation proceeds to step S840. Details of this calculation process are to be provided later. The results of the calculation are stored into the storage device 8. In step S840, the on-vehicle system 20 estimates the time point at which the vehicle is estimated to arrive at the destination before the operation proceeds to step S850. The arrival time point is estimated as in step S101 explained earlier. Namely, the estimated traveling time is determined by using the information indicating the current vehicle position detected by the navigation system (not shown) and the route information indicating the route searched by the navigation system and by dividing the remaining traveling distance ascertained based upon the route information by the preset average traveling speed. The estimated arrival time point is calculated by adding the estimated traveling time to the current time point.

In step S850, the on-vehicle system 20 calculates the difference between the playback end time point and the estimated arrival time point and then the operation proceeds to step S860. In step S860, the on-vehicle system 20 judges as to whether or not the difference that has been calculated in step S850 is equal to or greater than a predetermined time length. If it is judged that the difference between the playback end time point and the estimated arrival time point is equal to or greater than the predetermined time length, the operation proceeds to step S870, otherwise the operation proceeds to step S880. The operation proceeds to step S870 to change the total of the playback time lengths for the remaining programs by modifying the current program list, or the operation proceeds to step S880 to play the remaining programs without modifying the current program list.

Now, an explanation is given on the threshold value used to make the decision in step S860. The threshold value may be set through any of the following three methods.
1. A predetermined specific time length is used as the threshold value.
2. The threshold value is set to the value representing the smallest time difference between the standard playback time length and a modified playback time length.
3. The threshold value is set to a time length obtained by multiplying the total of the playback time lengths for playing the various contents information (the remaining programs) yet to be played by a predetermined multiplier.

The threshold value is set through method 2 above in the embodiment. The threshold value set through this method to reduce the playback time length is now explained in reference to the program list in FIG. 5. The time differences between the playback time lengths in the standard mode and the playback time lengths in the shorten 1 mode are calculated for the individual sets of contents information and the contents information with the smallest time difference is selected. In the example presented in FIG. 5, the smallest time difference of; 115–100=15 (sec) is calculated between the playback time lengths in the standard mode and the extend 1 mode for the weather forecast assigned with program number 2. The process through which the weather forecast is shortened in the shorten 1 mode is assigned as first shortening processing in which the time difference 15 (sec) is used as a first judging threshold value.

FIG. 8 presents an example of the playback time lengths and the judging threshold values selected to reduce the playback time lengths relative to the standard playback time lengths indicated in the program list. The table presented in FIG. 8 is created by the on-vehicle system 20 which executes the processing in step S830 by using the program list in FIG. 5 having been transmitted from the information providing center 10. In FIG. 8, the program numbers are entered in the first row. In the second row, the contents information types are indicated. In the third row, the standard playback time lengths corresponding to the individual sets of contents information are indicated. In the fourth row, the playback time lengths for playing the individual sets of contents information in the shorten 1 mode are indicated in units of seconds. In the fifth row, the differences between the standard playback time lengths and the playback time lengths in the shorten 1 mode are indicated in correspondence to the individual sets of contents information in units of seconds. In the sixth row, the various sets of contents information are ranked in the order in which the lowest number, i.e., 1 is assigned to the contents information the playback time length of which is reduced by the least amount.

In the seventh row, the playback time lengths for playing the individual sets of contents information in the shorten 2 mode are indicated in units of seconds. In the eighth row, the differences between the standard playback time lengths and the playback time lengths in the shorten 2 mode are indicated in correspondence to the individual sets of contents information in units of seconds. In the ninth row, the various sets of contents information are ranked in the order in which the lowest number, i.e., 1 is assigned to the contents information the playback time length of which is reduced by the least amount. In the tenth row, the playback time lengths for playing the individual sets of contents information in the shorten 3 mode are indicated in units of seconds. 0 indicates that the playback is canceled. In the eleventh row, the differences between the standard playback time length and the playback time lengths in the shorten 3 mode are indicated in correspondence to the individual sets of contents information in units of seconds. In the twelfth row, the various sets of contents information are ranked in the order in which the lowest number, i.e., 1 is assigned to the contents information the playback time length of which is reduced by the least amount. In the thirteenth row, the priority order ranks to be assumed when shortening the contents information are indicated. Of the information provided in the individual rows in the program list in FIG. 8, the contents of the information provided in the first~fourth rows, seventh row, tenth row and thirteenth row are identical to those in FIG. 5.

After the fourteenth row, the playback time lengths determined in the shortening processing and the judging threshold values are entered. In the fifteenth row, the playback time lengths corresponding to the individual sets of contents information determined through the first shortening processing mentioned earlier are indicated in units of seconds. Namely, the playback time length for the weather forecast assigned with program number 2 in the fifteenth row is reduced. In the sixteenth row, the length of time by which the playback time length is reduced through the first shortening processing is indicated in units of seconds. The lengths of time 15 (sec) by which the playback time length is reduced is used as the first judging threshold value in this example.

In the seventeenth row, the lengths of playback time for the individual sets of contents information determined through second shortening processing are indicated in units of seconds. Through the second shortening processing, the playback time length for the contents information which is ranked second in the sixth row is reduced. If there are a plurality of sets of contents information that are ranked second, the contents information that is the highest in the shortening priority order in the thirteenth row (Music 1 assigned with program number 5 in the example presented in FIG. 8) is selected. In the eighteenth row, the lengths of time by which the playback time lengths have been reduced following the second shortening processing are indicated in units of seconds. Accordingly, the length of time 35 (sec) by which the overall playback time length becomes reduced is assigned as a second judging threshold value. 35 (sec) in this example represents the sum of the time length 15 (sec) by which the playback time length for the weather forecast assigned with program number 2 is reduced through the first shortening processing and the time length 20 (sec) by which the playback time length for Music 1 assigned with program number 5 is reduced.

In the nineteenth row, the lengths of playback time for the individual sets of contents information determined through third shortening processing are indicated in units of seconds. Through the third shortening processing, the playback time length for playing the contents information with the second smallest time difference indicated in the sixth row and ranked lower in the shortening priority order in the thirteenth row than the contents information assigned with program number 5 (the traffic information assigned with program number 1 in the example in FIG. 8) is reduced. In the twentieth row, the lengths of time that have been reduced following the third shortening processing are indicated in units of seconds. The total time reduction of 55 (sec) is then assigned as a third judging threshold value. 55 (sec) represents the sum of the time reduction 35 (sec) achieved at the end of the second shortening processing and the time reduction of 20 (sec) by which the playback time length for playing the traffic information assigned with program number 1 is reduced.

In the twenty-first row, the lengths of playback time for playing the individual sets of contents information determined through fourth shortening processing are indicated in units of seconds. Through the fourth shortening processing, the playback time length for the contents information ranked highest in the shortening priority order in the thirteenth row among the sets of contents information with the fourth smallest time difference indicated in the sixth row (the shopping information assigned with program number 8 in the example in FIG. 8) is reduced. In the twenty second row, the lengths of time by which the playback time lengths have been reduced following the fourth shortening processing are indicated in units of seconds. A time reduction of 80 (sec) is then assigned as a fourth judging threshold value. 80 (sec) represents the sum of the time reduction of 55 (sec) achieved at the end of the third shortening processing and the time reduction of 25 (sec) achieved with regard to the playback time length for the shopping information assigned with program number 8.

In the twenty third row, the lengths of playback time for playing the individual sets of contents information determined through fifth shortening processing are indicated in units of seconds. Through the fifth shortening processing, the playback time length for the contents information ranked second in the shortening priority order in the thirteenth row after the contents information assigned with program number 8 among the sets of contents information with the fourth smallest time difference indicated in the sixth row (Music 3 assigned with program number 9 in the example in FIG. 8) is reduced. In the twenty fourth row, the lengths of time by which the playback time lengths have been reduced at the end of the fifth shortening processing are indicated in units of seconds. A time reduction of 105 (sec) is then assigned as a fifth judging threshold value. 105 (sec) represents the sum of the time reduction of 80 (sec) achieved at the end of the fourth shortening processing and the time reduction of 25 (sec) achieved with regard to the playback time length for the Music 3 assigned with program number 9.

A further explanation is omitted since the subsequent processing is executed in a similar manner. In the thirty-third and thirty-fourth rows, the playback time length for the individual sets of contents information determined through tenth shortening processing and the corresponding time reduction (the corresponding judging threshold value) are respectively indicated. At the end of the tenth shortening processing, the playback time lengths for all sets of contents information assigned with program numbers 1~10 will have been reduced in the shorten 1 mode. The thirty-third row in FIG. 8 is identical to the shorten 1 mode section in FIG. 5. Namely, through the first shortening processing~ninth shortening processing, the total playback time length is gradually reduced in the range between the total playback time length indicated in the standard section and the total playback time length indicated in shorten 1 mode section in FIG. 5.

Time reductions achieved through eleventh shortening processing~twentieth shortening processing in the shorten 2 mode and eleventh judging threshold value~twentieth judging threshold value are individually calculated in a manner similar to that with which the first time reduction~tenth time reduction achieved in the shorten 1 mode and the first judging threshold value~tenth judging threshold value are calculated as explained above. In the shorten 2 mode, the calculation is performed starting with the contents information with the least time difference between the playback time length for playing the contents information in the shorten 2 mode and the standard playback time length (indicated in the ninth row in FIG. 8), which is also ranked highest in the shortening priority order in the thirteenth row in FIG. 8. The twentieth shortening processing corresponds to the shorten 2 section in FIG. 5. Namely, through the eleventh shortening processing~nineteenth shortening processing, the total playback time length is gradually reduced in the range between the total playback time length indicated in the shorten 1 section in FIG. 5 and the total playback time length indicated in the shorten 2 section in FIG. 5.

In addition, time reductions achieved through twenty-first shortening processing~thirtieth shortening processing in the shorten 3 mode and twenty-first judging threshold value~thirtieth judging threshold value are individually calculated, as well. During this process, the calculation is performed starting with the contents information with the least time difference between the playback time length for playing the contents information in the shorten 3 mode and the standard playback time length (indicated in the twelfth row in FIG. 8), which is also ranked highest in the shortening priority order in the thirteenth row in FIG. 8. The thirtieth shortening processing corresponds to the shorten 3 section in FIG. 5. Namely, through the twenty-first shortening processing~twenty-ninth shortening processing, the total playback time length is gradually reduced in the range between the total playback time length indicated in the shorten 2 section in FIG. 5 and the total playback time length indicated in the shorten 3 section in FIG. 5.

While an explanation is given above on an example in which the playback time lengths are adjusted in the shorten modes, a similar calculation is performed in the extend modes as well. First time extension~tenth time extension to be achieved in the extend 1 mode and first judging threshold value~tenth judging threshold value used in the extend 1 mode, eleventh time extension twelfth time extension to be achieved in the extend 2 mode and eleventh judging threshold value~twelfth judging threshold value used in the extend 2 mode, and twenty first time extension~thirtieth time extension to be achieved in the extend 3 mode and twenty first judging threshold value~thirtieth judging threshold value used in the extend 3 mode are individually calculated. In other words, the first time extension~twenty-ninth time extension are achieved so as to gradually extend the total playback time length in the range between the total playback time length indicated in the standard section in FIG. 5 and the total playback time length indicated in the extend 3 section in FIG. 5.

In step S870 in FIG. 7, the on-vehicle system 20 modifies the program list in conformance to the difference between the playback end time point and the estimated arrival time point. The program list is modified either through the first shortening processing~thirtieth shortening processing or the first extension processing~thirtieth extension processing described above. To explain this in further detail by referring to FIG. 8, if the vehicle is estimated to arrive at the destination ahead of the playback end time point by 40 seconds, for instance, the discrepancy between the estimated arrival time point and the playback end time point exceeds the second threshold value, i.e., 35 (sec). Accordingly, the on-vehicle system 20 selects the third shortening processing to move the playback end time point forward by 55 seconds. As a result, it becomes possible to complete the playback of all the contents information yet to be played prior to the estimated arrival time point. As the on-vehicle system 20 modifies the program list, the operation proceeds to step S880.

As the playback of the current contents information is completed, the on-vehicle system 20 judges in step S880 as to whether or not the contents information the playback of which has just been completed is the last item (Music 4 assigned with program number 10 in the program list in FIG. 8) in the program list. If the contents information the playback of which has just been completed is judged to be the last item in the program list, the processing in the flowcharts in FIG. 7 and FIG. 4 ends. If, on the other hand, it is judged that the contents information is not the last item in the program list, the playback of the next set of contents information in the program list starts before the operation returns to step S810. Thus, the processing in steps S810~S880 is executed repeatedly each time the playback of a single set of contents information is completed.

Now, possible causes for a discrepancy between the playback end time point at which the playback of all the contents information is completed and the estimated arrival time point are explained. If the playback of a given set of contents information is halted by the driver or the traveling time is reduced due to a smooth traffic flow as described earlier, the estimated arrival time point is moved forward relative to the contents information playback end time point. In such a case, the on-vehicle system 20 modifies the program list so as to reduce the total playback time length through the method described above.

If, on the other hand, a traffic jam occurs in the traveling route or if the driver takes an on-route break, the estimated arrival time point is moved back relative to the contents information playback end time point. In this case, the on-vehicle system 20 modifies the program list so as to extend the total playback time length through the method described above.

While the explanation above has been given on an example in which information is provided from the information providing center 10 to a single vehicle, information may be provided to a plurality of vehicles. In such a case, the information providing center 10 concurrently executes the processing described above with the individual on-vehicle systems 20 installed in the plurality of vehicles.

The following advantages are realized through the vehicle information providing system in the third embodiment in addition to advantages (1), (2) and (4) achieved in the vehicle information providing system in the first embodiment.

(A) When selecting contents information, the information providing center 10 calculates the estimated traveling time to the destination based upon the information indicating the destination and the current position transmitted from the vehicle and selects the contents information by ensuring that the playback of all the contents information can be completed within the estimated traveling time. The information providing center 10 then assumes a correspondence between the center of the normal distribution curve in FIG. 6 obtained in advance based upon statistical data on automobile traveling times and the estimated traveling time and sets the center (average) of the normal distribution curve to the total standard playback time length for playing the contents information. The playback time lengths corresponding to the extend 1 mode, the extend 2 mode and the extend 3 mode, which are respectively equivalent to +δ, +2δ and +3δ relative to the total standard playback time length and the playback time lengths corresponding to the shorten 1 mode, the shorten 2 mode and the shorten 3 mode, which are respectively equivalent to −δ, −2δ and −3δ relative to the total standard playback time length, are individually calculated. The playback time lengths thus calculated are entered in the program list together with the total standard playback time length and the program list is transmitted to the on-vehicle system 20. As a result, even when the estimated traveling time to the destination changes on route due to a traffic condition such as a traffic jam, the information necessary to adjust the contents information playback time lengths in all conceivable changes that may occur in the estimated traveling time over almost the entire range of distribution shown in FIG. 6 is provided from the information providing center 10 to the on-vehicle system 20.

(B) Each time a set of contents information is played, the on-vehicle system 20 calculates the estimated arrival time point at which the vehicle is estimated to arrive at the destination based upon the information indicating the vehicle destination and the current vehicle position and also calculates the playback end time point at which the playback of the remaining programs is completed by referencing the program list when the length of remaining time before the playback of the current contents information ends matches a predetermined length of time (when an affirmative decision is made in step S810). If the difference between the estimated arrival time point and the playback end time point exceeds one of the judging values shown in FIG. 8 (if an affirmative decision is made in step S860), the program list is modified so as to complete the playback of the remaining programs before the estimated arrival time point and thus adjusts the length of time for playing the contents information yet to be played (step S870). As a result, the volume of information is adjusted as appropriate and it becomes possible to prevent a failure to play all the contents information in the program list before the vehicle arrives at the destination or to prevent the playback of the contents information from becoming completed prematurely before the arrival at the destination. In addition, since the estimated arrival time point and the playback end time point are calculated each time a set of contents information is played, the contents information can be played by efficiently utilizing the time elapsing while the vehicle is on route even when the estimated traveling time changes due to a traffic jam occurring in the traveling route or a break taken on route by the driver.

(C) When the program list is modified (to reduce or extend the playback time length), the playback time length is reduced or extended gradually so as to minimize the time difference between the standard playback time length and the modified playback time length, and thus, the playback time length does not change greatly because of the modification of the program list. In addition, if there are a plurality of sets of contents information that will manifest time differences equal to each other after their playback time lengths are changed, the playback time length of one set of contents information is adjusted in conformance to the shortening or extension priority order. Thus, if the driver decides that a news program carries greater importance, for instance, and accordingly ranks the news program low in the shortening priority order, the playback time length for the news program can be kept intact while the playback time lengths for the other contents information are reduced.

The above described embodiment is an example, and various modifications can be made without departing from the spirit and scope of the invention. For instance, while a navigation system (not shown) is included in the configuration of the on-vehicle information providing device 6 to detect the current vehicle position with the navigation system, a position detection device may be instead included in the sensor system 7 so as to detect the current vehicle position with the position detection device.

While the information providing center 10 uses the route information on the route searched by the navigation system at the on-vehicle system 20 in order to estimate the information utilization time length, the information utilization time length may be estimated by using VICS information as well. In such a case, the reliability of the estimated information utilization time length improves.

Instead of using the route information to calculate the estimated traveling time to the destination, the estimated traveling time may be determined by dividing an estimated traveling distance that is calculated by multiplying the linear distance between the current vehicle position and the destination by a predetermined multiplier, by an average traveling speed set in advance. In this case, the estimated traveling time can be calculated without the route information provided by the navigation system.

While the destination to which the vehicle is traveling and the utilization purposes of the contents information are entered through the on-vehicle information providing device 6 by the user, they may be automatically set by the on-vehicle information providing device 6 based upon the current vehicle position, the current time point and information entered in the past, instead. In such a case, the setting details can be verified by the vehicle driver.

Instead of entering the destination, the traveling purpose such as commuting or shopping may be entered. In such a case, distribution data on automobile utilization time lengths such as those shown in FIG. 6 should be stored in advance in the storage device 8 in correspondence to different traveling purposes including commuting and shopping. The on-vehicle information providing device 6 then reads out the distribution data corresponding to the entered traveling purpose from the storage device 8 and sets the time length at the center of the distribution curve (the average time length) as the estimated traveling time.

Contents information available at the on-vehicle system 20 in the vehicle may include music information and voice information recorded in the storage device 8 or on a recording medium (not shown) in addition to the music information recorded in a CD mentioned earlier. The music information may be provided as compressed data in the MP 3 (MPEG-1 Audio Layer-III) format, for instance.

While an explanation is given above in reference to the third embodiment on an example in which the program numbers assigned to the individual sets of contents information to indicate the order in which they are to be played are different from the shortening priority order ranks and the program numbers are also different from the extension priority order ranks, the program numbers may match the priority order ranks instead. In such a case, the total playback time length is reduced (or extended) gradually by executing the shortening processing (or the extension processing) on the contents information assigned with program number 1 first. For instance, the first shortening processing is executed on the contents information assigned with program number 1 in the first row in FIG. 8. Likewise, through the second shortening processing the contents information assigned with program number 2 also becomes shortened through the third shortening processing, the contents information assigned with program number 3 also becomes shortened.

In the third embodiment, the judging threshold values in FIG. 8 are each calculated as a value representing the smallest time difference between the standard playback time length and a shortened/extended playback time length through method 2 detailed earlier. Instead, the judging threshold values may be set through method 1 or method 3. For instance, while a threshold value is calculated by multiplying the total playback time length for playing the contents information (the remaining programs) yet to be played by a predetermined multiplier in method 3, the multiplier may be adjusted as the playback of the programs reaches an advanced stage and the number of programs to be played become smaller in conjunction with method 3 to improve the degree of freedom afforded when modifying the program list.

Each time a set of contents information is played, the on-vehicle system 20 calculates the estimated arrival time point at which the vehicle is estimated to arrive at the destination based upon the information indicating the vehicle destination and the current vehicle position when a predetermined length of time remains before the end of the contents information playback (when an affirmative decision is made in step S810) and calculates the playback end time point at which the playback of the remaining programs is completed by referencing the program list. Instead, the estimated arrival time point and the playback end time point at which the playback of the remaining programs is completed may be calculated in conformance to the number of calls received at the mobile telephone, since the number of calls received at the mobile telephone represents the number of communications made with the information providing center 10.

While contents information is played as sound in the examples explained above, contents information may be image information as well. Such image information may be played and displayed at the monitor of the car navigation system (not shown).

The disclosures of the following priority applications are herein incorporated by reference:

Japanese Patent Application No. 2001-383067 filed Dec. 17, 2001 Japanese Patent Application No. 2001-383068 filed Dec. 17, 2001

What is claimed is:

1. A vehicle information providing apparatus, comprising:
    a communication device that exchanges information with a vehicle;
    a traveling time estimation device that estimates a traveling time required or the vehicle to arrive at a destination based upon traveling information transmitted from the vehicle;
    an information selection device that selects information to be provided to the vehicle based upon a request transmitted from the vehicle;
    a list preparation device that prepares an information list of the information to be provided to the vehicle, which is selected by the information selection device so as to match a length of time over which the information is to be provided with the traveling time estimated by the traveling time estimation device; and
    a control device that controls the communication device so as to transmit the information list prepared by the list preparation device to the vehicle.

2. A vehicle information providing apparatus according claim 1, further comprising:
    a provision-time modifying information generating device that generates provision-time modifying information required to modify the length of time over which the information is to be provided, wherein:
    the information list includes the provision-time modifying information generated by the provision-time modifying information generating device.

3. A vehicle information providing apparatus according to claim 1, wherein:
    the control device controls the communication device to transmit information to the vehicle in conformance to the information list prepared by the list preparation device, controls the traveling time estimation device to re-estimate the traveling time each time a set of information on information list is provided to the vehicle and controls the list preparation device to modify the information list to ensure that the length of time for providing any remaining information matches the traveling time that has been re-estimated.

4. A vehicle information providing apparatus according to claim 1, wherein:
    the list preparation device prepares the information list so as to provide corresponding information at a specified time point indicated in the request transmitted from th vehicle; and
    the control device controls the communication device so as to transmit the information to the vehicle in conformance to the information list prepared by the list preparation device.

5. A vehicle information providing apparatus according to claim 1, wherein:
    the list preparation device prepares the information list to be provided to the vehicle so as to provide information corresponding to a specific area indicated in the request transmitted from the vehicle when the vehicle is in the area; and
    the control device controls the communication device so as to transmit the information to the vehicle in conformance to the information list prepared by th list preparation device.

6. A vehicle information providing apparatus according of claim 1, wherein:
    the list preparation device prepares a second information list of information to be provided to the vehicle, which is selected by the information selection device so as to match the length of time over which the information is to be provided with a time length smaller than the traveling time, and a third information list of information to be provided to the vehicle, which is selected by the information selection device so as to match the length of time over which the information is to be provided with a time length greater than the traveling time, in addition to the information list (a first information list) of the information to be provided to the vehicle, which is selected by the information selection device so as to match the length of time over which the information is to be provided with the traveling time estimated by the traveling time estimation device; and the control device controls the communication device so as to transmit the first information list, the second information list and the third information list to the vehicle.

7. A vehicle information providing apparatus according to claim 6, wherein:

the traveling time estimated by the traveling time estimation device is made to correspond with a center of a normal distribution representing a deviation of a length of time over which the vehicle is utilized, the time length smaller than the traveling time is made to correspond with a range between the center of the normal distribution and −3δ and the time length greater than the traveling time is made to correspond with a range between the center of the normal distribution and +3δ.

8. An on-vehicle information playing apparatus comprising:

a playback device that plays information in conformance to an information list listing a plurality of sets of information to be played in a vehicle;

a traveling time estimation device that estimates a traveling time required for the vehicle to arrive at a destination based upon vehicle traveling information;

a playback time calculation device that calculates a playback time length for the information played by the playback device; and an information list modification device that individually modifies the sets of information listed in the information list so as to match the playback time length calculated by the playback time calculation device with the traveling time estimated by the traveling time estimation device.

9. An on-vehicle information playing apparatus according of claim 8, wherein:

the information list includes data corresponding to a standard playback time length, data corresponding to a playback time length in a shorten mode and data corresponding to a playback time length in an extend mode for each set of information to be played in the vehicle; and the information list modification device modifies the information list by selecting one type of data among the data corresponding to the standard playback time length, the data corresponding to the playback time length in the shorten mode and the data corresponding to the playback time length in the extend mode for each set of information contained in the information list.

10. An on-vehicle information playing apparatus according to claim 9, wherein:

the information list further includes data indicating a priority order in which the plurality of sets of information are to be played in the vehicle; and the information list modification device successively selects data in a set of information having lower priority order in the data corresponding to the playback time length in the shorten mode.

11. An on-vehicle information playing apparatus according to claim 10, wherein:

the information list modification device successively selects data in a set of information with a smaller time difference between the shortened/extended playback time length and the standard playback time length in the data corresponding to the playback time length in the shorten/extend mode.

12. An on-vehicle information playing apparatus according to claim 11, wherein:

the information list modification device selects the data corresponding to the playback time length in the shorten/extend mode if a difference between the estimated traveling time and the calculated playback time length is greater than the time difference between the shortened/extended playback time length and the standard playback time length.

13. An on-vehicle information playing apparatus according to claim 12, further comprising:

an instruction device that issues an instruction to the traveling time estimation device to estimate the traveling time and issues an instruction to the playback time calculation device to calculate the playback time length each time a set of information is played by the playback device.

14. An on-vehicle information playing apparatus according to claim 12, further comprising:

an instruction device that issues an instruction to the traveling time estimation device to estimate the traveling time and issues an instruction to the playback time calculation device to calculate the playback time length in conformance to the number of calls received at a telephone in the vehicle.

15. An on-vehicle information playing apparatus according to claim 9, wherein:

the information list further includes data indicating a priority order in which the plurality of sets of information are to be played in the vehicle; and the information list modification device successively selects data in a set of information having a higher priority order in the data corresponding to the playback time length in the extend mode.

16. An on-vehicle information playing apparatus according to claim 15, wherein:

the information list modification device successively selects data in a set of information with a smaller time difference between the shortened/extended playback time length and the standard playback time length in the data corresponding to the playback time length in the shorten/extend mode.

17. An on-vehicle information playing apparatus according to claim 16, wherein:

the information list modification device selects the data corresponding to the playback time length in the shorten/extend mode if a difference between the estimated traveling time and the calculated playback time length is greater than the time difference between the shortened/extended playback time length and the standard playback time length.

18. An on-vehicle information playing apparatus according to claim 17, further comprising:

an instruction device that issues an instruction to the traveling time estimation device to estimate the traveling time and issues an instruction to the playback time calculation device to calculate the playback time length each time a set of information is played by the playback device.

19. An on-vehicle information playing apparatus according to claim 17, further comprising:

an instruction device that issues an instruction to the traveling time estimation device to estimate the traveling time and issues an instruction to the playback time calculation device to calculate the playback time length in conformance to the number of calls received at a telephone in the vehicle.

20. A vehicle information providing apparatus comprising a communication means for exchanging information with a vehicle;

a traveling time estimation means for estimating a traveling time required for the vehicle to arrive at a destination based upon traveling information transmitted from the vehicle;

an information selection means for selecting information to be provided to the vehicle based upon a request transmitted from the vehicle;

a list preparation means for preparing an information list of the information to be provided to the vehicle, which is selected by the information selection means so to match a length of time over which the information is to be provided with the traveling time estimated by the traveling time estimation means; and a control means for controlling the communication means so as to transmit information to the vehicle in conformance to the information list prepared by the list preparation means.

21. An on-vehicle information playing apparatus comprising:

a playback means for playing information in conformance to an information list listing a plurality of sets of information to be played in a vehicle;

a traveling time estimation means for estimating a traveling time required for the vehicle to arrive at a destination based upon vehicle traveling information;

a playback time calculation means for calculating a playback time length for the information played by the playback means; and an information list modification means for individually modifying the se of information listed in the information list so as to match the playback time length calculated by the playback time calculation means with the traveling time estimated by the traveling time estimation means.

22. A vehicle information providing method comprising:

receiving traveling information transmitted from a vehicle;

estimating a traveling time required for the vehicle to arrive at a destination based upon the traveling information that has been received;

selecting information to be provided to the vehicle based upon a request transmitted from the vehicle;

preparing an information list of information to be provided to the vehicle, which is selected so as to match a length of time over which the information is to be provided with the estimated traveling time; and transmitting the information to the vehicle in conformance to the information list that has been prepared.

23. An on-vehicle information playing method for playing information in conformance to an information list listing a plurality of sets of information to be played in a vehicle, comprising:

estimating a traveling time to elapse before the vehicle arrives at a destination based upon vehicle traveling information;

calculating a playback time length for playing the information to be played in the vehicle; and individually modifying the sets of information listed in the information list so as to match the calculated playback time length with the estimated traveling time.

* * * * *